3,352,687
PREPARATION OF FROZEN QUICK-COOKING LEGUMES
Louis B. Rockland, Pasadena, and Eugene A. Metzler, Glendale, Calif., assignors to the United States of America as represented by the Secretary of Agriculture
No Drawing. Filed Apr. 26, 1965, Ser. No. 451,080
5 Claims. (Cl. 99—98)

ABSTRACT OF THE DISCLOSURE

Dry legume seeds—e.g., lima beans, small white beans, smooth or wrinkled peas, etc.—are impregnated with an aqueous hydration medium by application of vacuum-release treatments, followed by soaking at ambient temperature in the medium. The hydrated seeds are then frozen and kept in frozen storage until ready for consumption. The hydration medium typically contains salt, a chelating agent such as sodium tripolyphosphate or the sodium salt of ethylenediamine tetraacetic acid, and sodium carbonate or bicarbonate.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of processes for producing frozen quick-cooking products from edible seeds of legumes, e.g., conventional dry beans or peas. Further objects of the invention will be evident from the following description wherein parts and percentages are by weight unless otherwise specified.

The problems with which the invention is concerned and application of the invention are explained below, having particular reference to beans. It is to be understood, however, that a similar situation is encountered with the seeds of other plants of the pea family and in its broad aspect the invention is applicable to legume seeds in general, typically seeds of the genus Phaseolus including the common beans such as large white, small white, pinto, red kidney, lima, etc.; the genus Pisum including smooth and wrinkled peas; the genus Vigna including the blackeye beans (or blackeye peas as they are sometimes termed); the genus Lens including lentils; the genus Cicer including garbanzo or chick peas; the genus Soja, that is soybeans; etc. The legume seeds to which the process of the invention is applied are the usual dry seeds available in commerce. For example, in the case of beans, these products are often referred to as dry shell beans because the product includes only the mature seeds, the pods having been removed in one of the steps in their production.

Dry beans, sometimes termed shell beans, are conventionally produced by the following technique: The bean plants are grown in the usual manner, allowing them to remain in the field until the beans in the pod are mature and dry. The beans are then harvested, the individual beans being separated from the pods and vines. The harvested beans are then subjected to cleaning and sorting operations and packaged for sale. Although the beans in this form are a valuable food material, they have the disadvantage that their preparation for the table requires a long time. Thus the beans must be first soaked overnight in water and then cooked for anywhere from one to four hours or more to make them tender. To avoid these long periods of soaking and cooking it has been advocated that the beans be given certain treatments so that the consumer can prepare them for the table in a relatively short time. For example, it has been advocated that the beans be given a soak in water with or without a partial cooking or parboiling and then dried and packaged for sale. Although such procedures do shorten the cooking time, they do not yield a satisfactory product from various standpoints. For one thing, the individual beans do not remain intact; they are cracked or split and in the case of some varieties of beans—limas, for example—each pair of cotyledons opens out to exhibit what may be termed a butterfly appearance. Such disruption of the natural structure of the seeds is not only unsightly but when the products are cooked, they form a mush or soup of disintegrated bean material. As a consequence the known products are suitable only for preparing soup dishes; they are totally useless where the aim is to prepare a dish containing the individual, integral beans.

The procedure in accordance with the invention obviates the disadvantages discussed above. Thus the products of the invention have a primary advantage in that they are quick-cooking. To prepare them for the table, they are added to boiling water and after simmering for a period of about 10 to 20 minutes are tender and ready for consumption. Moreover, this quick-cooking character is attained without significant damage to the individual beans. They retain their original structure with no cracking, splitting, or butterflying. As a consequence, they have a very attractive appearance and, moreover, when cooked still retain the integral character of the individual beans. Thus the products of the invention are eminently suited for the preparation of dishes wherein the structure of the individual beans needs to be maintained. It is to be noted that in many varieties of ordinary dry beans, for example, lima beans, the skin is the portion most impervious to moisture and which offers the greatest resistance to softening during cooking. However in the products of the invention, the skin as well as the cotyledons take up water readily and acquire a proper tenderness for eating with a very short cooking time. In addition to having the property of being quick-cooking and retaining their original structure, the products of the invention exhibit an excellent natural color and flavor, and may be kept for long periods of time without losing their quick-cooking character. (Many known products have a tendency to revert on storage, i.e., to lose their capability of being cooked in a short period of time.)

Another point is that the invention can be utilized to prepare quick-cooking products from "hard shell" beans. This aspect of the invention is further elucidated as follows: When dry beans are stored for long periods at relatively high moisture levels and/or high humidity, they become extremely refractory to cooking. Often such beans—generally termed "hard shells"—will require a cooking period ten times as long as that required for normal beans of the same variety. By application of the procedure of the invention such beans can be readily converted into products which require but a 10–20 minute cook to make them ready for the table.

In essence, the production of frozen quick-cooking beans in accordance with the invention involves the following steps:

(I) Dry beans are hydrated, using a special aqueous hydration medium and preferably conducting the hydration by a vacuum impregnation technique.

(II) The hydrated beans are then frozen and maintained in frozen storage until they are to be consumed. If desired, the hydrated beans may be washed with water prior to the freezing step.

As noted briefly above, a feature of the invention is that a special medium is used in the hydration step. Although this medium is largely water, it contains certain additives which provide advantageous results which could not be obtained with water alone. These useful effects of the additives are exerted during the hydration step and/or subsequent thereto. Thus since the additives are present in the medium which penetrates throughout the beans when they are hydrated, the additives may exert their desired activity at this stage. Moreover, since the additives stay in the beans even after the subsequent procedural steps, they remain distributed throughout the bean tissue where they can exert their influence in subsequent treatment of the products, for example, in storage, cooking, and consumption thereof.

A primary consideration is that the hydration medium contains one or more tenderizing agents. These agents contribute largely to the goal of attaining a product that is quick-cooking, i.e., one that can be prepared for the table by heating in water for a period of a quarter of an hour or less. Thus during the hydration step, these agents cause a tenderizing of the bean tissue, particularly of the skins. Such action is, of course, very desirable because the skins exhibit an especially tough and impervious nature. Moreover, when the products of the invention are cooked, the tenderizing agents distributed in the bean tissue cooperate with the applied heat and moisture to cause a further and rapid tenderizing of both cotyledons and skins, yet without such a violent action as to cause any substantial sloughing or other physical disruption of the individual beans. Such a desirable action is attained by having present in the hydration medium, primarily the following: sodium chloride and a chelating agent. The sodium chloride has the principal effect of softening the skins. Usually, the sodium chloride is present in the hydrating medium in a concentration of about from 1 to 3%. The chelating agent exerts a variety of useful effects, including following: (1) It softens the pellicle or skin. (2) It aids in the solubilization of proteins, such as those in the cotyledons. (3) It acts as a buffer to maintain pH. (4) It facilitates uniform penetration of additives into the centers of the cotyledons, so that the final products have a uniformly smooth texture. (5). It tends to lighten the color of the product. With respect to the last item, the following will further explain this point: As hereinafter explained, an alkali metal carbonate, or bicarbonate, is a desirable constituent of the hydrating medium of the invention. However, when such agents are applied to such items as large white lima beans, the beans take on a green or yellow-green color. This undesirable color change is presented when a chelating agent is present with the carbonate or bicarbonate; in such event, the beans retain their normal light color. In a practice of the invention, various conventional chelating agents may be used such as the alkali metal salts of ethylenediamine tetracetic acid (hereinafter referred to as EDTA), alkali metal pyrophosphates or tripolyphosphates, citric acid or its alkali metal salts, etc. Generally, the chelating agent is added to the hydrating medium in a concentration of about from 0.1 to 5%. Particularly preferred is the conjoint use of sodium tripolyphosphate and tetrasodium EDTA—for example, 1% of the former; 0.5% of the latter—as providing especially good results coupled with a minimum amount of the chelating agents.

For best results, it is preferred that the hydrating medium be slightly alkaline, that is, have a pH of about 9. Depending on the chelating agent selected, this value may be attained directly, or it may be necessary to add an alkaline material, for example, sodium hydroxide, or more preferably, sodium carbonate or bicarbonate. The carbonate, or bicarbonate, not only acts as an alkaline agent and buffer but also acts as a protein dissociating, solubilizing or tenderizing agent. Particularly good results are attained with a mixture of sodium carbonate and sodium bicarbonate and the preferred form of the hydrating medium contains these components in concentrations of about 0.25% sodium carbonate and 0.75% sodium bicarbonate.

Optionally, the hydration medium may contain additional agents. For example, one may include a trace (about 0.01–0.05%) of a reducing agent such as sodium sulphide, cysteine, sodium mercaptoglycollate, or the like to assist in tenderizing the seeds. An edible-grade surface active agent such as polyoxyethylene sorbitan palmitate or stearate may be added in minor concentration (about 0.05–0.5%) to assist penetration of the medium into the seeds. Antioxidants, for example, butylated hydroxy anisole, butylated hydroxy toluene, ascorbyl palmitate, etc., may be added to the hydration medium for their fat-stabilizing effect. Other additives which may be employed are anti-microbial agents such as sodium sorbate or benzoate. Although any such optional ingredients may be used, we have found that they are not critical and excellent products from the standpoints of color, flavor, stability, and ease of cooking are prepared wherein the hydration medium simply contains the basic ingredients: sodium chloride, alkali metal salt of EDTA, sodium tripolyphosphate, sodium carbonate, and sodium bircarbonate.

In a practice of the present invention, the legume seeds are preferably hydrated by the manipulative procedure described in the copending application of L. B. Rockland et al., Ser. No. 355,127, filed Mar. 26, 1964, now Patent No. 3,318,708, granted May 9, 1967. In applying this procedure, the dry beans are placed in a vessel together with an excess of the hydrating medium as hereinabove described using, for example, a weight of the hydrating medium about from 2.5 to 5 times the weight of the beans. The vessel is closed and a vacuum is applied, then released. This cycle involving application of vacuum and release of vacuum is repeated several times, usually 2 to 20 times, depending on the hydration resistance of the beans, over a period of about 5 to 60 minutes.

Our investigations have shown that such vacuum impregnation or hydration yields results entirely different from those obtained with ordinary soaking. Thus where dry beans are simply soaked in water, the penetration of water is strictly from the outer surface of the beans toward the inside. This type of penetration is very slow and, moreover, it causes the establishment of stresses and strains in the seeds so that when they are subsequently cooked they crack and split. In the procedure in question, however, the entry of the water follows an entirely different course. As a first step, the withdrawal of air from the bean tissues by the vacuum, followed by release of the vacuum causes the liquid to rush into the space between the skin and the cotyledon, the liquid entering this space through minute openings in the skin and/or through the hilum or the micropyle. Thus, as a first step the water is actually placed within the structure of the bean. Once the water is thus inside it can diffuse readily into the various structures of the bean. For example, it diffuses inwardly into the cotyledon and outwardly through the various layers of the skin. It is of interest to note that the skin is composed of several layers and the outermost is the most impervious to liquids. As a consequence moisture can penetrate more easily from the innermost to the outermost layer of the skin than it can in the reverse direction. Another important factor is that when the water enters into the bean by the vacuum treatment it contacts the innermost (water-permeable) layer of the skin and quickly makes the skin plastic so that it can expand without developing any tendency to rupture. As a matter of fact, after applying the several cycles of vacuum and release of vacuum, it is noted that each bean is in a swollen distended condition. This is caused by the swelling of the skin and the establishment of a pool of liquid inside the skin and surrounding the cotyledon. When this state is reached the beans are simply allowed to remain in contact with the hydrating medium to complete their hydration. The time required for completing the hydration will vary with such factors as the size, variety, moisture content, post-harvest age, and time-temperature history of the beans. In general, a time of about 2 to 24 hours is used. In any particular case, the time of hydration is readily determined by simply feeling the beans from time to time as they are soaking. Thus when the cotyledons have taken up so much water they have swelled to fit the swollen skin and the skin no longer feels loose, the procedure is complete. The hydration of the beans is ordinarily conducted at ambient (room) temperature. Operation under such conditions is not only convenient but also provides excellent results. However, it is within the scope of the invention to carry out the process at temperatures above or below the ambient. As an example, the process may be conducted at elevated temperatures whereby to increase the rate of hydration.

After the beans have been hydrated, they may be washed with water to remove the hydrating medium from the surface of the beans. This washing is conveniently carried out by placing the hydrated beans on a screen and spraying them with water for a short time. Additives may be incorporated into the wash water to accomplish certain ends. As an example, glycerine may be added in a concentration of about 5 to 10% whereby to plasticize the skins, that is, keep them in a soft or elastic condition. Also, a minute amount of ascorbic acid may be incorporated in the wash water as a means of minimizing oxidation of oxidizable components in the skin when the products are stored before use.

Following washing, or directly after hydration, the beans are frozen. This is conveniently effected by placing the beans on trays and exposing them to refrigerated air. Generally, the air temperature and conditions of treatment (e.g., rate of air flow) are selected so that the freezing takes place rapidly. Generally, an air temperature of less than 0° F. is used and circulation of the air is rapid enough to get freezing of the beans in a short time, i.e., 5 minutes or less. The frozen beans are then packaged in conventional manner and kept in frozen storage until used. For especially rapid freezing, the beans may be immersed in a cold liquid medium instead of being exposed to cold air. Especially useful in this connection is the technique of plunging the beans into liquid nitrogen whereby they become frozen almost instantaneously. The frozen beans are then packaged and held in frozen storage as described. If desired, the treated beans may be packaged first and then frozen in conventional equipment such as a plate freezer.

When it is desired to prepare them for the table, the frozen beans are directly immersed in boiling water and held therein at about the boiling point until tender, this period being about 10–20 minutes. The beans may then be salted and buttered as desired and are ready to eat.

The invention is further demonstrated by the following illustrative examples:

*Examples 1 to 6*

A solution was prepared containing water and the following ingredients:

| | Percent |
|---|---|
| Sodium chloride | 2.5 |
| Sodium tripolyphosphate | 1.0 |
| Tetrasodium EDTA | 0.5 |
| Sodium bicarbonate | 0.75 |
| Sodium carbonate | 0.25 |

The pH of the solution was 9.0

Several different lots of dried beans and dried peas were treated with the above solution, using the following technique in each case. The dried beans (or peas) were placed in a vessel together with enough of the solution to cover them. The vessel was closed and connected to a source of vacuum. The vacuum was maintained for about a minute, then the vacuum was released. After about a half minute the vacuum was again applied, held for a minute, then released, and so on. In all 10 cycles of vacuum application and release were used. The system was then allowed to stand, at room temperature and at atmospheric pressure, with the beans (or peas) in contact with the solution until the cotyledons swelled to fill the swollen skins. The hydration time applied in each case is given in the following table. (It is to be noted that the time of hydration varies, depending on many factors, as hereinabove explained, and it is not maintained that the particular times used are necessarily applicable to other lots of legume seeds.) Following residence in the hydration medium, the products were drained and frozen. The products were then ready for packaging or use. It was observed that in all cases the seeds retained their structure intact with no noticeable cracking or splitting.

To test the cooking quality of the products, each lot thereof was added to boiling water and simmered until the products reached a standard tenderness, typical of properly cooked beans. In all cases the cooked product had an excellent flavor and the seeds were essentially intact with no significant mushing or sloughing.

The results are given in the following table:

| Ex. | Variety or type | Time of residence in hydration medium prior to freezing, hours | Time required to cook product, minutes |
|---|---|---|---|
| 1 | Lima (large) beans | 5 | 15 |
| 2 | Pinto beans | 10 | 15 |
| 3 | Red kidney beans | 10 | 15 |
| 4 | Calif. small white beans | 15 | 20 |
| 5 | Peas (green variety) | 10 | 11 |
| 6 | Soybeans | 20 | 18 |

The quick-cooking nature of the products is illustrated by the following: The product of Example 1, as above described, was cooked to standard tenderness in 15 mintues. In contrast, the original dry lima beans, from which this product was prepared, required first an overnight soak in water, then cooking for 80 minutes to bring both the cotyledons and skins to the same degree of tenderness as obtained with the product of Example 1 in a 15-minute cook with no soaking prior to cooking.

*Example 7*

In this run, the starting material was a lot of large lima beans which had been stored for several years and which had developed a "hard shell" character. A sample of these beans, prepared for the table by conventional manner (soaking in water at ambient temperature for 16 hours, followed by cooking in water) required cooking for 200 minutes to make them tender enough to be edible.

On the other hand, a batch of these same beans treated as described in Examples 1–6 above, with a hydration time of 16 hours, yielded a product which required cooking for only 15 minutes to make it tender and ready to eat.

Having thus described the invention, what is claimed is:

1. A method for preparing quick-cooking products from edible dry legume seeds which comprises subjecting the seeds while they are in contact with an aqueous hydrating medium to a vacuum, then releasing the vacuum, repeating the cycle of vacuum application and release until the skins of the seeds are swollen by entry of the medium into the seeds, holding the seeds in contact with the said medium at ambient temperature and atmospheric pressure for a period long enough for the cotyledons to swell until they fill the swollen skins, and freezing the resulting hydrated products, wherein the said aqueous hydrating medium contains sodium chloride in a concentration of about from 1 to 3%, a chelating agent in a concentration of about from 0.1 to 5%, and has a slightly alkaline pH.

2. The process of claim 1 wherein the aqueous hydrating medium contains sodium chloride in a concentration of about from 1 to 3%, a mixture of sodium tripolyphosphate and a salt of ethylene diamine tetraacetic acid in a concentration of about from 0.1 to 5%, and has a slightly alkaline pH.

3. A method for preparing quick-cooking products from edible dry legume seeds which comprises subjecting the seeds while they are in contact with an aqueous hydrating medium to vacuum, then releasing the vacuum, repeating the cycle of vacuum application and release until the skins of the seeds are swollen by entry of the medium into the seeds beneath the skins, holding the seeds in contact with said medium at ambient temperature and atmospheric pressure for a period long enough for the cotyledons to swell until they fill the swollen skins, and freezing the resulting hydrated products, the said aqueous hydrating medium containing the following ingredients:

| | Percent (about) |
|---|---|
| Sodium chloride | 2.5 |
| Sodium tripolyphosphate | 1.0 |
| Na salt of EDTA | 0.5 |
| Sodium bicarbonate | 0.75 |
| Sodium carbonate | 0.25 |

4. The process of claim 3 wherein said seeds are beans.
5. The process of claim 3 wherein said seeds are peas.

References Cited

UNITED STATES PATENTS

| 1,668,903 | 5/1928 | Haslacher | 99—193 |
| 3,318,708 | 5/1967 | Rockland et al. | 99—98 |

OTHER REFERENCES

Tressler et al. The Freezing Preservation of Foods, The AVI Publishing Co., Inc., Westport, Conn., 1957, pp. 143–146, 149, 150.

A. LOUIS MONACELL, *Primary Examiner.*

S. E. HEYMAN, *Assistant Examiner.*